United States Patent
Waters et al.

(10) Patent No.: US 10,776,568 B2
(45) Date of Patent: Sep. 15, 2020

(54) INDICATING SENTIMENT OF TEXT WITHIN A GRAPHICAL USER INTERFACE

(71) Applicant: Atlassian Pty Ltd, Sydney, New South Wales (AU)

(72) Inventors: Emma Jane Waters, Sydney (AU); Stacy Nicole London, San Francisco, CA (US)

(73) Assignee: ATLASSIAN PTY LTD, Sydney, New South Wales (AU)

( * ) Notice: Subject to any disclaimer, the term of this patent is extended or adjusted under 35 U.S.C. 154(b) by 0 days.

(21) Appl. No.: 16/792,215

(22) Filed: Feb. 15, 2020

(65) Prior Publication Data

US 2020/0184145 A1    Jun. 11, 2020

Related U.S. Application Data

(63) Continuation of application No. 16/129,721, filed on Sep. 12, 2018, now Pat. No. 10,565,403.

(51) Int. Cl.
   *G06F 17/00* (2019.01)
   *G06F 40/166* (2020.01)
   *G06F 40/30* (2020.01)

(52) U.S. Cl.
   CPC ............ *G06F 40/166* (2020.01); *G06F 40/30* (2020.01)

(58) Field of Classification Search
   CPC ............................... G06F 40/166; G06F 40/30
   See application file for complete search history.

(56) References Cited

U.S. PATENT DOCUMENTS

| | | |
|---|---|---|
| 8,818,788 B1 | 8/2014 | Mihalik |
| 8,996,625 B1 | 3/2015 | Singleton |
| 9,336,268 B1 | 5/2016 | Moudy |
| 9,413,891 B2 | 8/2016 | Dwyer |
| 9,633,008 B1* | 4/2017 | Brand ............... G06F 40/30 |
| 9,875,230 B2 | 1/2018 | Fink |
| 9,996,504 B2 | 6/2018 | Zaragoza |
| 10,007,661 B2 | 6/2018 | Arquero |
| 10,050,926 B2* | 8/2018 | Ebersman ......... G06F 3/04886 |
| 10,162,812 B2 | 12/2018 | Pradhan |

(Continued)

OTHER PUBLICATIONS

Waters, U.S. Appl. No. 16/129,721, filed Sep. 12, 2018, Office Action dated Oct. 10, 2019.

(Continued)

*Primary Examiner* — Laurie A Ries
(74) *Attorney, Agent, or Firm* — Hickman Palermo Becker Bingham LLP

(57) ABSTRACT

A method of enabling distributed collaboration with sentiment indicators is disclosed. The method comprises obtaining a set of computer-executable instructions, which when executed cause a client device of one or more client devices to operate a graphical user interface (GUI). The GUI is configured for: receiving text via a first area of a screen of the GUI; estimating a sentiment of the text; determining that the estimated sentiment exceeds a certain level of negativity; and after the determining, requesting a confirmation of releasing the text or an update of the text. The method further comprises receiving a response to the request and sending the text to a server; and transmitting the set of computer-executable instructions to a first client device of the one or more client devices.

20 Claims, 9 Drawing Sheets

(56) References Cited

U.S. PATENT DOCUMENTS

| | | |
|---|---|---|
| 10,409,913 B2 | 9/2019 | Bhatt |
| 2010/0312769 A1 | 12/2010 | Bailey |
| 2012/0179751 A1* | 7/2012 | Ahn .................. G06Q 30/0282 |
| | | 709/204 |
| 2012/0191502 A1 | 7/2012 | Gross |
| 2013/0212083 A1 | 8/2013 | Beattie |
| 2014/0215351 A1* | 7/2014 | Gansca ................. G06Q 50/01 |
| | | 715/751 |
| 2015/0113018 A1 | 4/2015 | Steed |
| 2015/0149153 A1 | 5/2015 | Werth |
| 2015/0379144 A1* | 12/2015 | Wong .................... G06Q 50/01 |
| | | 707/754 |
| 2016/0063993 A1 | 3/2016 | Dolan |
| 2016/0350644 A1 | 12/2016 | Devarajan |
| 2016/0350664 A1* | 12/2016 | Devarajan ............. G06Q 50/01 |
| 2016/0358207 A1 | 12/2016 | Montague |
| 2017/0149713 A1* | 5/2017 | Bastide .................. H04L 51/16 |
| 2017/0220578 A1 | 8/2017 | Kazi |
| 2017/0249389 A1 | 8/2017 | Brovinsky |
| 2017/0250931 A1 | 8/2017 | Ioannou |
| 2017/0308985 A1 | 10/2017 | Grom |
| 2018/0063063 A1* | 3/2018 | Yan ........................ H04L 51/26 |
| 2018/0183929 A1 | 6/2018 | Fang |
| 2018/0197088 A1* | 7/2018 | Bonin .................... G06F 40/30 |
| 2018/0316635 A1 | 11/2018 | Chiu |
| 2018/0330303 A1 | 11/2018 | Mosley |
| 2018/0373697 A1 | 12/2018 | Jain |
| 2019/0034417 A1* | 1/2019 | On ........................ G06F 40/284 |
| 2019/0130289 A1* | 5/2019 | Giovannini ......... G06F 16/9024 |
| 2019/0333078 A1* | 10/2019 | Bala .................... G06Q 30/0201 |
| 2020/0004816 A1* | 1/2020 | Kieser .................... G06F 40/30 |
| 2020/0026696 A1* | 1/2020 | Ledet ..................... G06F 16/93 |
| 2020/0050306 A1* | 2/2020 | Tan ........................ G06F 3/011 |
| 2020/0065383 A1* | 2/2020 | Hadi .................... G06F 40/284 |
| 2020/0081965 A1* | 3/2020 | Waters ................... G06F 40/30 |
| 2020/0082415 A1* | 3/2020 | LaTerza ................. G06F 40/20 |

OTHER PUBLICATIONS

Waters, U.S. Appl. No. 16/129,721, filed Sep. 12, 2018, Notice of Allowance dated Dec. 16, 2019.

Waters, U.S. Appl. No. 16/129,721 filed Sep. 12, 2018, Interview Summary dated Dec. 2, 2019.

* cited by examiner

FIG. 3E

INDICATING SENTIMENT OF TEXT WITHIN A GRAPHICAL USER INTERFACE

BENEFIT CLAIM

This application claims the benefit under 35 U.S.C. § 120 as a Continuation of application Ser. No. 16/129,721, filed Sep. 12, 2018, the entire contents of which are hereby incorporated by reference for all purposes as if fully set forth herein. Applicant hereby rescinds any disclaimer of claim scope in the parent applications or the prosecution history thereof and advises the USPTO that the claims in this application may be broader than any claim in the parent applications.

FIELD OF THE DISCLOSURE

One technical field of the present disclosure is digital data collaboration and graphical user interfacing. Another technical field is analysis and presentation of sentiments of communications through a graphical user interface in a distributed, collaborative computing environment.

BACKGROUND

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

Today, much of our communication is through digital data of written words in a distributed computing environment. Such written communication is generally expedient, conducive to the fast pace of modern life. However, such written communication may not express the communicator's intention as precisely or comprehensively as spoken or face-to-face communication. Especially when the written words are as hastily reviewed as they are quickly transmitted, misunderstanding or frustration can often occur. When such written communication is conducted on a collaboration platform, where the written communication is generated and received by a relatively large number of users, the volume of negative sentiments can grow even faster or to a much larger extent. Therefore, in a distributed, collaborative computing environment, it would be helpful to have a mechanism for curbing or preventing the development of negative sentiments.

SUMMARY

The appended claims may serve as a summary of the invention.

BRIEF DESCRIPTION OF THE DRAWINGS

In the drawings:

FIG. 3A illustrates an example screen of a graphical user interface in which no comment is displayed and a sentiment indicator is displayed.

FIG. 3B illustrates an example screen of a graphical user interface in which a comment is displayed and a sentiment indicator is displayed.

FIG. 3C illustrates an example screen of a graphical user interface in which a slightly negative comment is displayed, a sentiment indicator is displayed, and a related description or suggestion is displayed.

FIG. 3D illustrates an example screen of a graphical user interface in which a significantly negative comment is displayed, a sentiment indicator is displayed, and a related description or suggestion is displayed.

FIG. 3E illustrates an example screen of a graphical user interface in which a positive comment is displayed, a first sentiment indicator is displayed, and a related description or suggestion with a second sentiment indicator is displayed.

DETAILED DESCRIPTION

Figure 1:
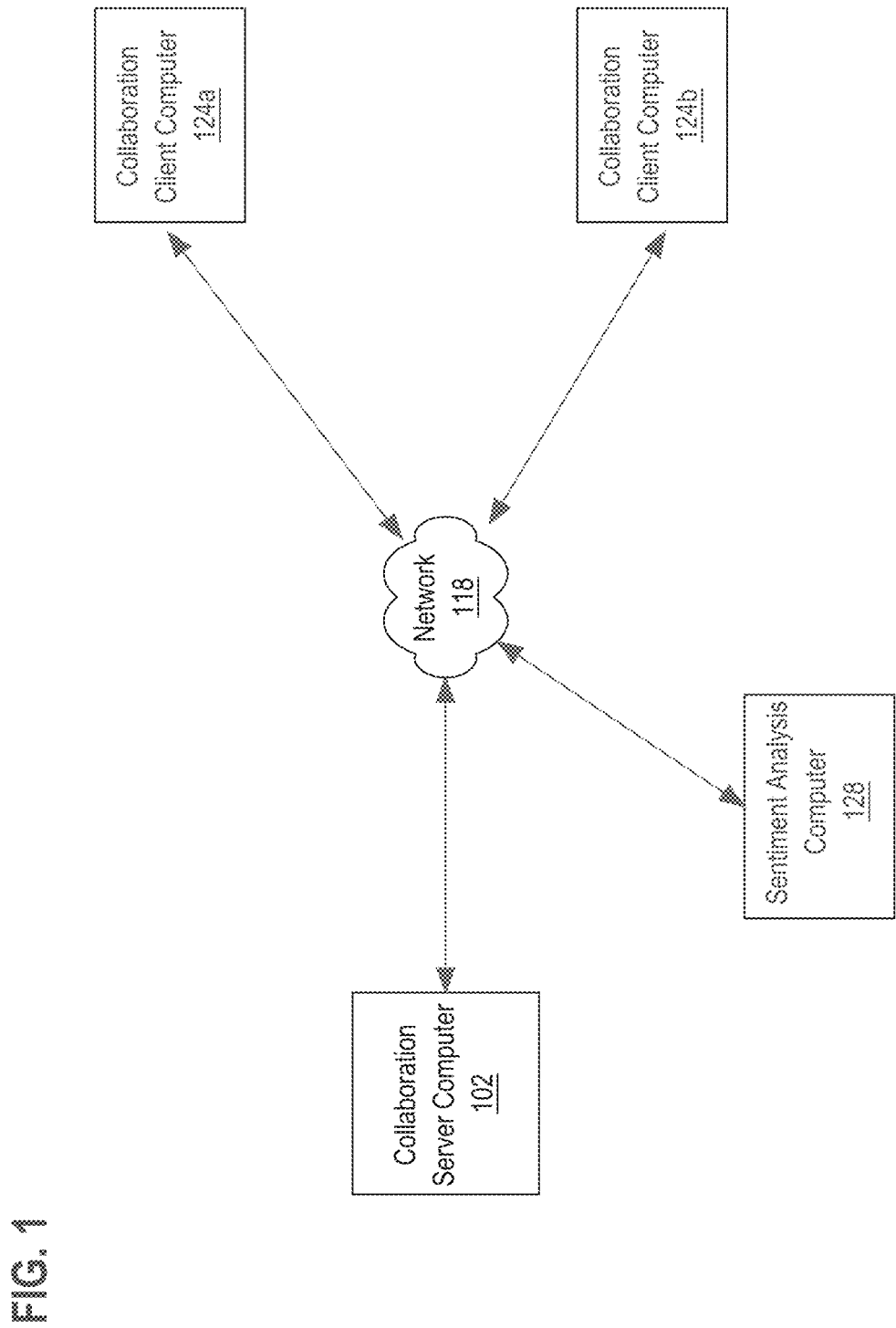
FIG. 1 illustrates an example networked computer system in which various embodiments may be practiced.

In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

General Overview

A system for indicating estimated sentiments next to entered text or other expressions and related methods are disclosed. In some embodiments, the system comprises a collaboration server computer (server) and one or more client devices. The server is programmed to manage a database of all digital data being collaborated on in a distributed computing environment. The server is programmed to also prepare a set of instructions for managing a graphical user interface (GUI) for collaborating on digital data and related data processing. The GUI enables input or display of main contents, such as programming code, and other text, such as comments on the main contents.

In some embodiments, a client device is programmed to receive the set of instructions from the server. The client device is programmed to execute the set of instructions, thereby presenting an instance of the GUI and performing the related data processing. More specifically, the client device is programmed to receive specific text via the instance of the GUI, estimate a sentiment of the specific text, and cause a display of a sentiment indicator having a specific value corresponding to the estimated sentiment. This process can be repeated every time a triggering condition is satisfied, such as when a certain volume of text has been entered, a certain amount of time has passed, or a user request for estimating the sentiment is received. As a result, an estimated sentiment can be continuously communicated as text is entered via the instance of the GUI. The sentiment indicator can take on a list of values, such as a list of emojis, corresponding to a range of sentiments. The sentiment indicator can also be accompanied by additional information, such as a textual description of the estimated sentiment or a recommendation of how to update the entered text to improve the estimated sentiment.

In some embodiments, in response to a subsequent request to submit the entered text to the server, the client device is programmed to further review the estimated sentiment for at least a portion of the entered text and determine whether it is appropriate to publish the entered text in the distributed computing environment. For example, when the estimated sentiment of the entered text is excessively negative, publication of the entered text might be disruptive to the collaboration in the distributed computing environment. In such a case, the client device is programmed to offer another opportunity to improve the entered text or reconsider the submission of the entered text to the server. The client device can be configured to redisplay the sentiment indicator with the appropriate value and any suggestion for updating the entered text. The client device can also be configured to request a confirmation of the request for submission from the user who entered the text or a supervisor device, or a reason for submitting the entered text. After receiving necessary feedback to the request for reconsidering submitting the entered text to the server, the client device can be programmed to finally submit the entered text to the server.

The system offers several technical benefits. A sentiment indicator is shown with continuously updated values reflecting the estimated sentiment of the entered text near the area where the text is entered. Therefore, the system enables awareness of estimated sentiments of provided contents in near real time and easily accessible manners. The display of the sentiment indicator alone or in combination with a recommendation of how to improve the estimated sentiment also leads to production of better comments and ultimately better main contents to which the comments pertain. Such improvement of quality further leads to reduced network trips of transmitting additional main contents or comments due to confusion or agitation and reduced resource utilization for processing such additional main contents or comments by the server and the client devices.

Example Computing Environments

FIG. 1 illustrates an example networked computer system in which various embodiments may be practiced. FIG. 1 is shown in simplified, schematic format for purposes of illustrating a clear example and other embodiments may include more, fewer, or different elements connected in various manners.

In some embodiments, the networked computer system forms a distributed computing environment and comprises a collaboration server computer (server) 102 and two (or more) collaboration client computers 124a, 124b which are communicatively coupled directly or indirectly via one or more networks 118.

In some embodiments, the server 102 broadly represents one or more computers, virtual computing instances, and/or instances of a server-based application that is programmed or configured to host or execute functions including but not limited to creating and maintaining a set of instructions for managing a graphical user interface (GUI) for collaborating on digital data and related data processing, and managing the digital data being collaborated on. Collaborating on digital data may include providing or interacting with main contents, other text, such as comments on the main contents, or sentiment indicators for the text, by one of the collaboration client computers 124a, 124b in the distributed computing environment. The update and maintenance of the set of instructions and specifically the functionality of the GUI can be based on user feedback on the GUI. For example, in response to receiving repeated indications from the collaboration client computers 124a, 124b that the way the sentiment indicator is displayed is distracting or annoying, the functionality of the GUI can be updated to show the sentiment indicator in less intrusive manners. Managing the digital data being collaborated on may include receiving an update to existing contents from one of the collaboration client computers 124a, 124b, reconciling the update with the existing contents as necessary, or transmitting the update or the result of reconciliation to all the collaboration client computers. The server 102 can comprise a server farm, a cloud computing platform, a parallel computer, special-purpose hardware, or any other computing facility with sufficient computing power in data processing, data storage, and network communication for the above-described functions.

In some embodiments, each collaboration client computer such as 124a is programmed to receive the set of instructions for managing the GUI and related data processing from the server 102. The collaboration client computer 124a is programmed to further execute the set of instructions to present an instance of the GUI and perform the related data processing based on user interactions with the instance of the GUI. In addition, the collaboration client computer 124a is programmed to transmit some of the received or processed data, including certain digital data being collaborated on or user feedback on the instance of the GUI, back to the server 102 for publication in the distributed computing environment or for improvement of the GUI. The collaboration client computer 124a is also programmed to receive updates to the digital data being collaborated on made by the collaboration client computer 124b or other collaboration client computers. The collaboration client computers 124a, 124b may comprise computing facility with sufficient computing power in data processing, data storage, and network communication for the above-described functions. The collaboration client computers 124a, 124b can comprise a desktop computer, laptop computer, tablet computer, smartphone, or wearable device.

The sentiment analysis computer 128 is programmed to estimate the sentiment of given text and produce a sentiment score value. The sentiment analysis computer 128 may provide an application programming interface (API) or other interfaces for receiving input data to invoke the sentiment estimation service and transmitting output data from executing the sentiment estimation service. The sentiment analysis computer 128 may comprise computing facility with sufficient computing power in data processing, data storage, and network communication for the above-described functions.

The networks 118 may be implemented by any medium or mechanism that provides for the exchange of data between the various elements of FIG. 1. Examples of network 118 include, without limitation, one or more of a cellular network, communicatively coupled with a data connection to the computing devices over a cellular antenna, a near-field communication (NFC) network, a Local Area Network (LAN), a Wide Area Network (WAN), the Internet, a terrestrial or satellite link, etc.

In some embodiments, the server 102 is programmed to prepare the set of instructions for managing the GUI and related data processing. Each of the collaboration client computers 124a, 124b is programmed to then request and retrieve and execute the set of instructions. As a result, the collaboration client computers 124a, 124b are programmed to present an instance of the GUI and perform the related data processing. Specifically, in accordance with the set of instructions, the collaboration client computer 124a is programmed to receive text, which can be related to certain main contents. The collaboration client computer 124a can be programmed to estimate the sentiment of the received text by communicating with the sentiment analysis computer 108 or executing locally stored sentiment determination methods. The collaboration client computer 124a is programmed to further cause showing a sentiment indicator for the text with a value corresponding to the estimated sentiment and request a confirmation for submitting the text to the server 102. In response to receiving the confirmation or other triggering events, the collaboration client computer 124a is programmed to then submit the text to the server 102. The server 102 is programmed to then transmit the text to the collaboration client computer 124b, either automatically or upon request by the collaboration client computer 124b. The collaboration client computer 124b is then programmed to show the text submitted by the collaboration client computer 124a via the associated instance of the GUI.

Example Computer Components

Figure 2A:
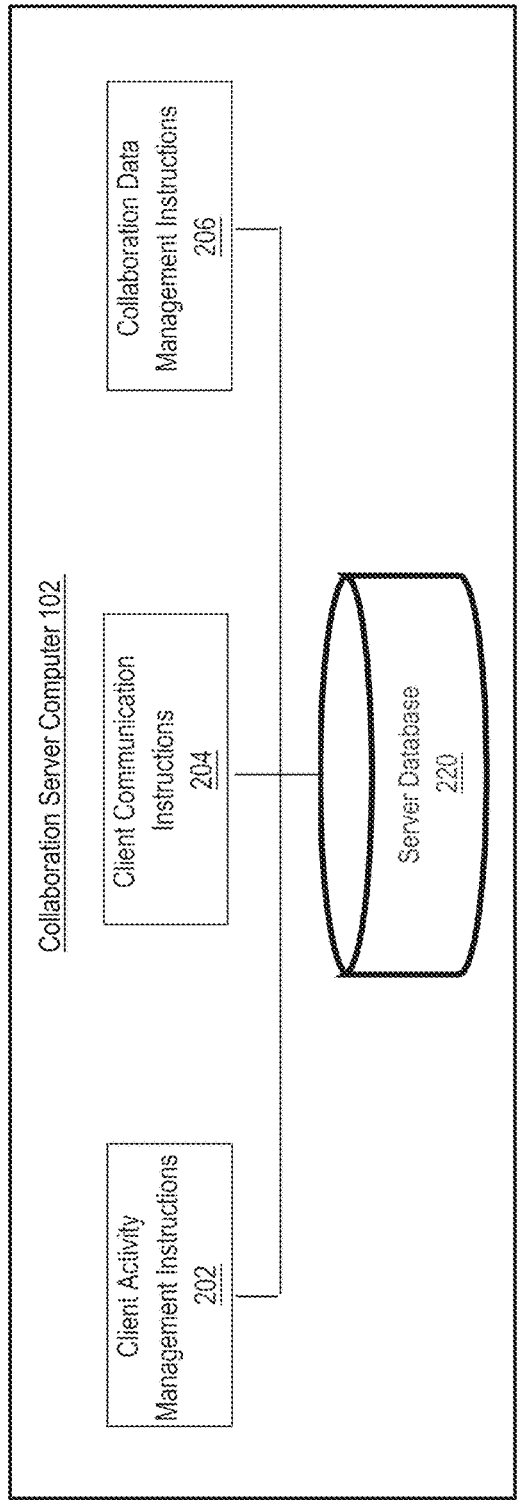
FIG. 2A illustrates example computer components of a collaboration server computer.
Figure 2B:
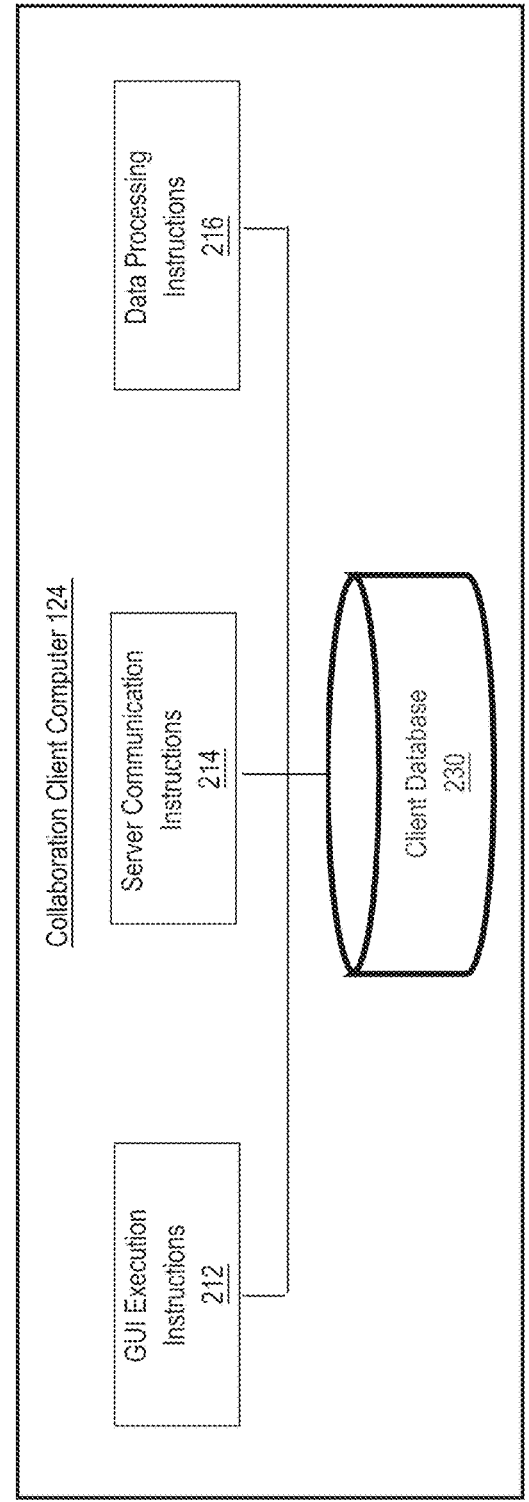
FIG. 2B illustrates example computer components of a collaboration client computer.

FIG. 2A illustrates example computer components of a collaboration server computer. FIG. 2B illustrates example computer components of a collaboration client computer. FIG. 2A and FIG. 2B are each shown in simplified, schematic format for purposes of illustrating a clear example and other embodiments may include more, fewer, or different elements connected in various manners. Each of the functional components can be implemented as software components, general or specific-purpose hardware components, firmware components, or any combination thereof. A storage component can be implemented using any of relational databases, object databases, flat file systems, or JSON stores. A storage component can be connected to the functional components locally or through the networks using programmatic calls, remote procedure call (RPC) facilities or a messaging bus. A component may or may not be self-contained. Depending upon implementation-specific or other considerations, the components may be centralized or distributed functionally or physically.

In some embodiments, the server 102 comprises a client activity management component having client activity management instructions 202, a client communication component having client communication instructions 204, and a collaboration data management component having collaboration data management instructions 206. In addition, the server 102 comprises a server database 220.

In some embodiments, the client activity management instructions 202 allow creation and maintenance of a set of instructions to be executed by each of the collaboration client computers 124a, 124b. The set of instructions pertains to the management of a GUI for collaborating on digital data and related data processing, such as the presentation of graphical elements, the input or output of data via the graphical elements, or the processing of the inputted data or the data to be outputted. The update or maintenance of the set of instructions can be performed based on user feedback on the GUI transmitted by the collaboration client computers 124a, 124b.

In some embodiments, the client communication instructions 204 enable communication with each of the collaboration client computers 124a, 124b. The communications can include initially delivering the set of instructions and subsequently delivering updates to the set of instructions according to specific schedules or in response to requests from the collaboration client computers 124a, 124b. The communications can further include receiving updates to the digital data being collaborated on or user feedback on the GUI or publishing the updates to the digital data being collaborated on in the distributed computing environment.

In some embodiments, the collaboration data management instructions 206 allow management of different types of data being collaborated on. The different types of data may include main contents, such as programming code, other text, such as comments on the main contents, or sentiment indicators for the text. Updates to these data can be reconciled with existing contents stored by the server database 220. The receipt of each of the updates from one of the collaboration client computers 124a, 124b can be logged in terms of timing, sender, or other attributes. The distribution of the update to the other collaboration client computers can similarly be logged in terms of timing, recipient, or other attributes.

In some embodiments, the server database 220 is programmed or configured to manage relevant data structures and store relevant data for functions performed by the server 102. The data may be related to the collaboration client computers 124a, 124b which communicate with the server 102, the set of instructions for managing a GUI for collaborating on digital data and related data processing, user feedback on the GUI or the data processing, the digital data being collaborated on, or collaboration activities, such as reconciling or publishing pieces of the digital data being collaborated on. Specifically, the set of instructions may include computer code for estimating the sentiment of specific contents, such as certain comments on the main contents. The set of instructions may also include a list of values for a sentiment indicator, such as a list of emojis showing a range of expressions corresponding to a list of sentiments.

In some embodiments, each of the collaboration client computers 124a, 124b comprises a GUI execution component having GUI execution instructions 212, a server communication component having server communication instructions 214, and a data processing component having data processing instructions 216. In addition, the collaboration client computer 124a, 124b comprises a client database 230.

In some embodiments, the GUI execution instructions 212 enable execution of the set of instructions received from the server 102 for managing the GUI for collaborating on digital data and related data processing. More specifically, the GUI execution instructions 212 enable the presentation of an instance of the GUI to receive and display data and the processing of the inputted data or the data to be outputted. The data to be outputted may have originated from any of the collaboration client computers 124a, 124b.

In some embodiments, the server communication instructions 214 enable communication with the server 102. The communications can include initially receiving the set of instructions and subsequently receiving updates to the set of instructions according to specific schedules or in response to requests from the collaboration client computer 124a, 124b. The communications can further include sending updates to the digital data being collaborated on or user feedback on the GUI or receiving updates to the digital data being collaborated on made by another collaboration client computer in the distribute computing environment. In certain embodiments, the updates to the digital data being collaborated on could be directly sent to or received from other collaboration client computers instead of through the server 102.

In some embodiments, the data processing instructions 216 enable processing of different types of data, such as analyzing certain text, such as comments on the main contents, determining values for sentiment indicators that reflect the sentiments of the text, or evaluating user interactions with the sentiment indicators. The processed data may be displayed via the instance of the GUI presented by the collaboration client computer 124*a*, 124*b* through the GUI execution component or transmitted back to the server 102 for further analysis or publication in the distributed computing environment through the server communication component. In certain embodiments, one or more portions of such data processing can be performed by the server 102, specifically the collaboration data management component or another component. The server communication instructions 214 then enable sending the data to be processed to the server 102. The client communication instructions 204 then enable receiving the data to be processed and sending the processed data. The server communication instructions 214 then further enable receiving the processed data.

In some embodiments, the client database 230 is programmed or configured to manage relevant data structures and store relevant data for functions performed by the collaboration client computer 124*a*, 124*b*. The data may be related to the set of instructions for managing a GUI for collaborating on digital data and related data processing, user feedback on the GUI or the data processing, or the digital data being collaborated on. The data being collaborated on, such as comments on main contents or corresponding sentiment indicator values, may be received via the instance of the GUI presented by the collaboration client computer 124*a*, 124*b* or from the server 102.

Functional Descriptions

In some embodiments, the server 102 is programmed or configured with data structures and/or database records that are arranged to create and maintain a set of instructions for managing a GUI for a collaboration platform and related data processing in which, in one embodiment, main contents are entered or displayed, other text is entered or displayed, a sentiment score value for the other text is automatically calculated, and a sentiment indicator and/or additional data corresponding to the sentiment score value are displayed.

Figure 3A:
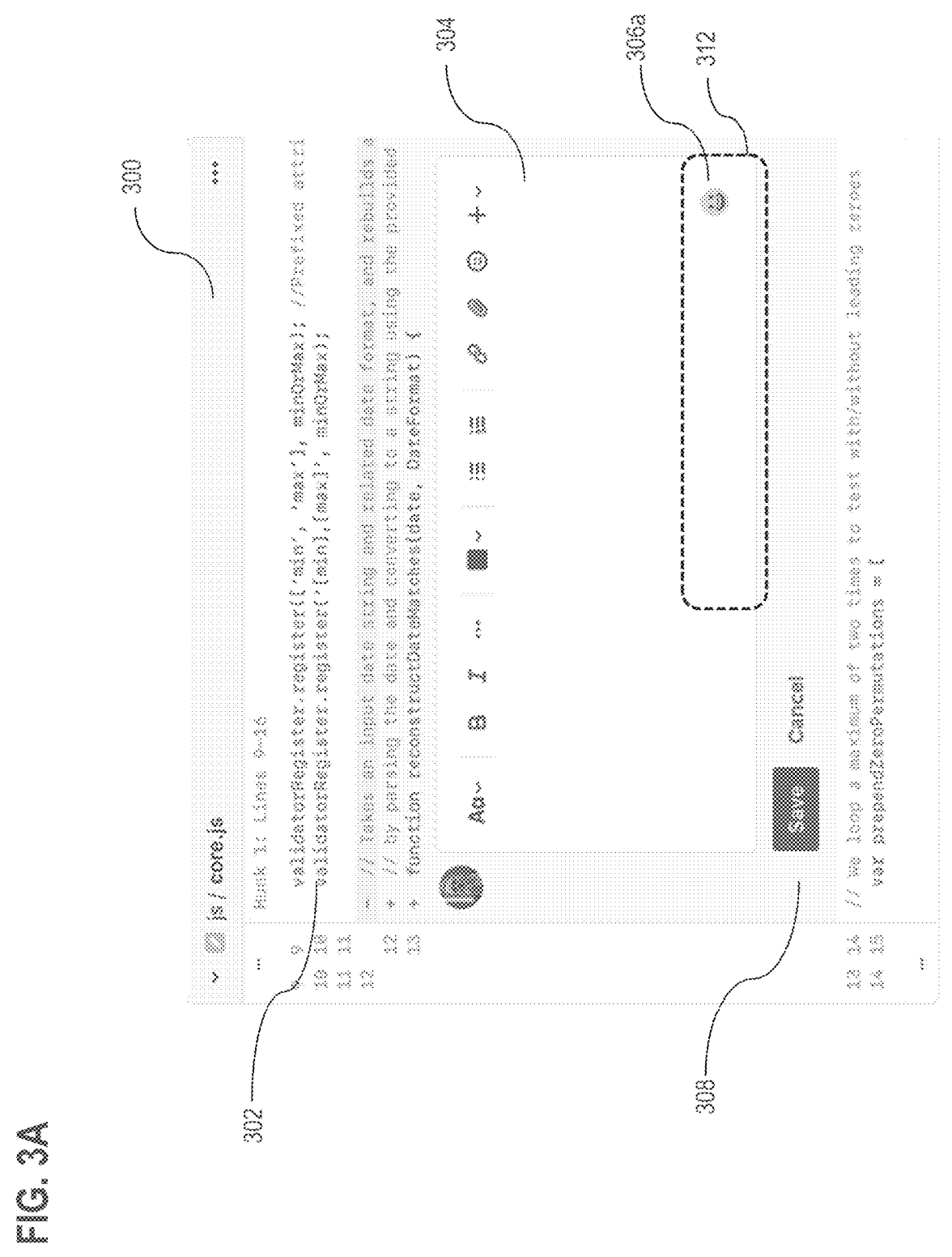

FIG. 3A illustrates an example screen of a graphical user interface in which no comment is displayed and a sentiment indicator is displayed. In some embodiments, the screen 300 of the GUI for collaborating on digital data includes a first area 302 for showing main contents, such as programming code. The screen 300 includes a second area 304 for receiving other text, such as comments on the main contents. The second area 304 can include an editor or a recording device to capture comments. The screen 300 also includes a third area 312 for showing a sentiment indicator 306, which indicates an automatically estimated sentiment of the comments entered into the second area 304.

The sentiment indicator can take on different values through a change in appearance as more comments are entered into the second area 304 and/or as text in the second area is changed via user input. In this example, the example sentiment indicator value 306*a* corresponds to an initial state when no comment has been entered. It can correspond to a relatively positive sentiment to encourage the writing of positive comments.

In an embodiment, the screen 300 includes a fourth area 308 for receiving an instruction on whether to send the entered comments to the server for access by other client devices or discard the entered comments. The screen 300 may also include another area for showing comments already sent to the server by the same client device or other client devices.

Configuring the Graphical User Interface and Related Data Processing

In some embodiments, for various aspects of the GUI and the related data processing, the server 102 can be programmed to implement any of the options discussed below or allow an administrator to choose any of these options by receiving configuration data from a data file or an associated administrator device.

Referring back to FIG. 3A, in some embodiments, the size and position of the third area 312 on the screen may be configurable. The default may be to position the third area 312 next to the second area 304 but significantly limit the size of the third area 312 to achieve easy visibility but reduce distraction from working in the second area 304. For example, the third area 312 can be positioned near the lower-right corner of the second area 304 towards which the display of the entered text grows.

In some embodiments, the appearance of the sentiment indicator 306 may be configurable. The sentiment indicator 306 preferably has a relatively small size and provides a summary of the sentiment of the entered text. The sentiment indicator 306 can be in the form of a graphical icon, a sound snippet, or another compact, user-perceivable representation. For example, an icon can have, as different values, different emojis, shapes, or colors that represent different sentiments. As another example, the emojis can range from an acknowledging or welcoming face to a scared or embarrassed face, the colors can range from green to red, or the shapes can range from a heart to a knife. In an embodiment, the different values of an icon correspond to different sentiment score values that have been calculated for input text. A particular value from among a plurality of different values may be selected, based upon a particular sentiment score value that was calculated for particular text, using hard-coded program instructions, a stored data table that maps sentiment score values or ranges of sentiment score values to different values of different icons, or other mapping and selection techniques.

In some embodiments, the contents displayed in the third area 312 and the manners of such display may be configurable. In addition to, or as an alternative to, one sentiment indicator that summarizes the sentiment of the entered text, additional data can be displayed to further describe the sentiment, such as a textual description or message or a second sentiment indicator that has a higher information content or covers a different portion of the entered text. The additional data can be displayed automatically, or in response to a user request, such as an interaction with the third area 312 or a selection from a menu.

In some embodiments, additional data can also be displayed to describe a recommended action in response to the estimated sentiment. For example, when the estimated sentiment is overtly negative, the recommended action may be to adjust the tone by rewriting an entire sentence or replacing certain words. For rewriting purposes, a first list of words, phrases, sentences, or sentence structures that are generally associated with negative sentiments can be maintained. A second list of words, phrases, sentences, or sentence structures that are generally associated with positive sentiments can also be maintained. The second list can be subdivided into a first sub-list for purely positive sentiments, such as "Great job!", and a second-sub-list for transitioning from negative sentiments to positive sentiments, such as "This could use some refinement, How about?". When a portion of the entered text matches an entry in the first list, that portion can be highlighted and one or more appropriate replacements from the second list can be shown.

In any of these embodiments, the different values of the additional data may correspond to different sentiment score values that have been calculated for input text. A particular item of additional data from among a plurality of different items of additional data may be selected, based upon a particular sentiment score value that was calculated for particular text, using hard-coded program instructions, a stored data table that maps sentiment score values or ranges of sentiment score values to different identifiers of different additional data items, or other mapping and selection techniques.

In some embodiments, the actions taken before sending the entered text to the server may be configurable. In response to receiving a selection of the option to send the entered text to the server, when the estimated sentiment satisfies a certain criterion, such as a sentiment score less than a threshold indicating excessive negativity, a request can be displayed for confirming delivery of the entered text to the server or providing a reason for publishing the entered text in the distributed computing environment. More restrictive measures can also be taken, such as refraining from sending the entered text to the server immediately and requesting a re-selection the option to send the entered text only after a certain amount of time.

In some embodiments, the timing of reviewing the entered text, determining a corresponding sentiment, and updating the sentiment indicator 306 can be configurable. The timing can correspond to a spatial constraint, such as every certain number of characters, words, lines, sentences, or paragraphs of text entered via the GUI. The timing can also be determined in response to other specific events, periodically, in accordance with a specific schedule, or upon user requests. For example, a specific event could be that a certain amount of time has passed since any character was last entered into the second area 304. In addition, as more text is entered, the sentiment can be estimated for only the text entered since the last sentiment estimation, for all the text in a cumulative manner, or for both.

Managing the Graphical User Interface and Related Data Processing

In some embodiments, the server 102 is programmed to send the set of instructions for managing the GUI and related data processing to a client device according to a specific schedule or in response to a request by the client device. The client device is programmed to then execute the set of instructions to present an instance of the GUI and perform the related data processing. The following discussion refers to a client device or a processor for the purpose of illustrating a clear example, but other embodiments may use a server or a processor of a server in a functionally equivalent manner.

In some embodiments, a client device is programmed to present an instance of the GUI and perform the related data processing based on the configuration data. FIGS. 3B, 3C, 3D, and 3E are continuations of FIG. 3A and illustrate how the GUI changes in response to user interactions.

Figure 3B:
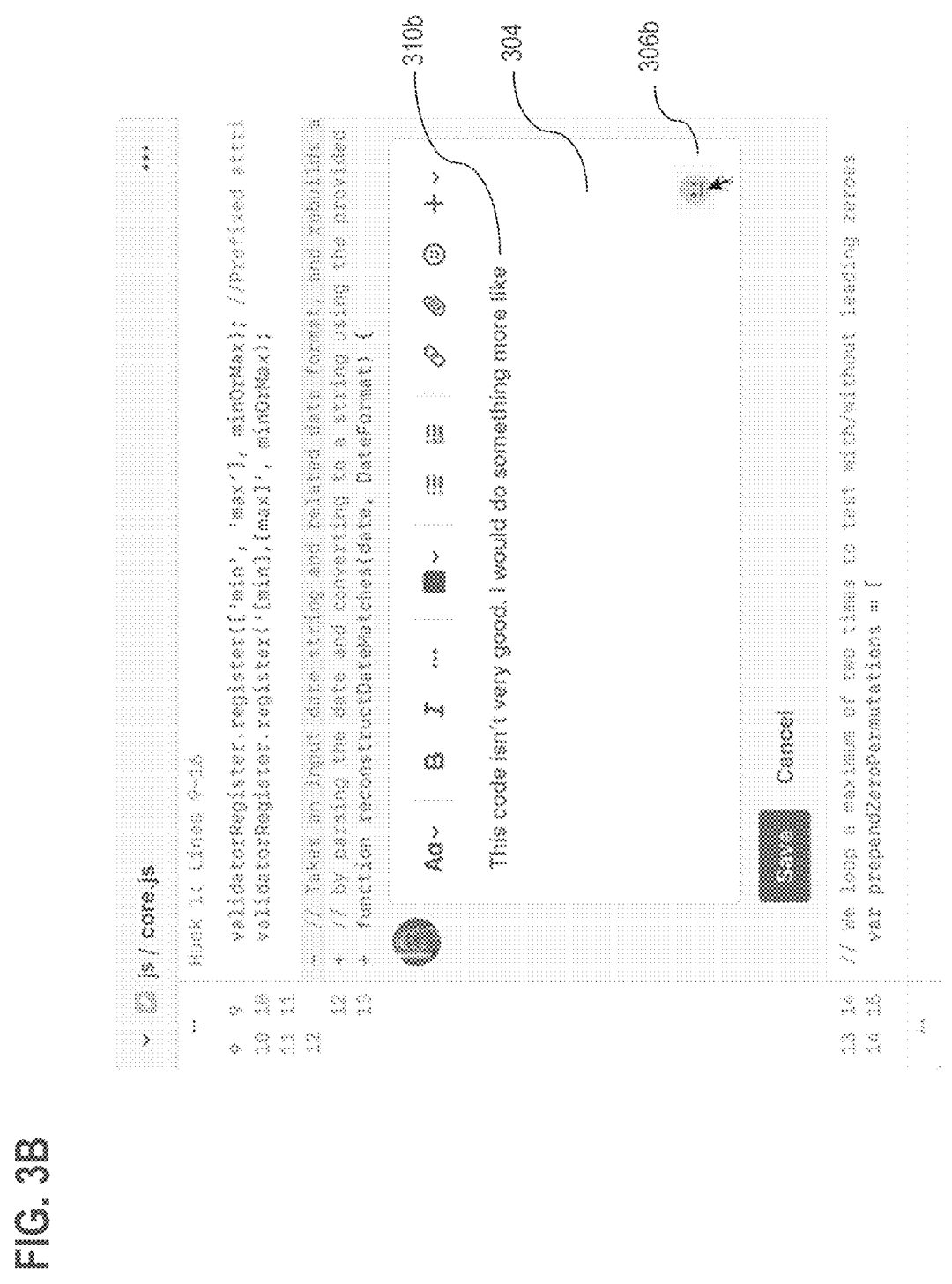

FIG. 3B illustrates an example screen of a graphical user interface in which a comment is displayed and a sentiment indicator is displayed. In some embodiments, in response to receiving the entered comments 310b, the client device is programmed to estimate the sentiment of the entered comments 310b and obtain a sentiment score value. The sentiment can be estimated using any technique known to someone skilled in the art, such as the methods available from Google Cloud Natural Language API or Microsoft Azure Text Analysis API. The client device can be programmed to map the list of possible sentiment score values produced by a technique to the list of sentiment indicator values. For example, the sentiment indicator may take on 10 values corresponding to 10 different icons, and a sentiment score value from 0 to 1 produced by a technique can be mapped to the 10 icons in increments of 0.1. Alternatively, the client device can directly receive a sentiment indicator value corresponding to an estimated sentiment. The client device is programmed to then cause a display or redisplay of the sentiment indicator with the appropriate value 306b. In this example, the sentiment indicator 306 is shown as a small icon in the third area 312 located near the lower-right corner of the second area 304. As the entered comments 310b do not sound positive, the icon 306b has a less than enthusiastic expression.

Figure 3C:
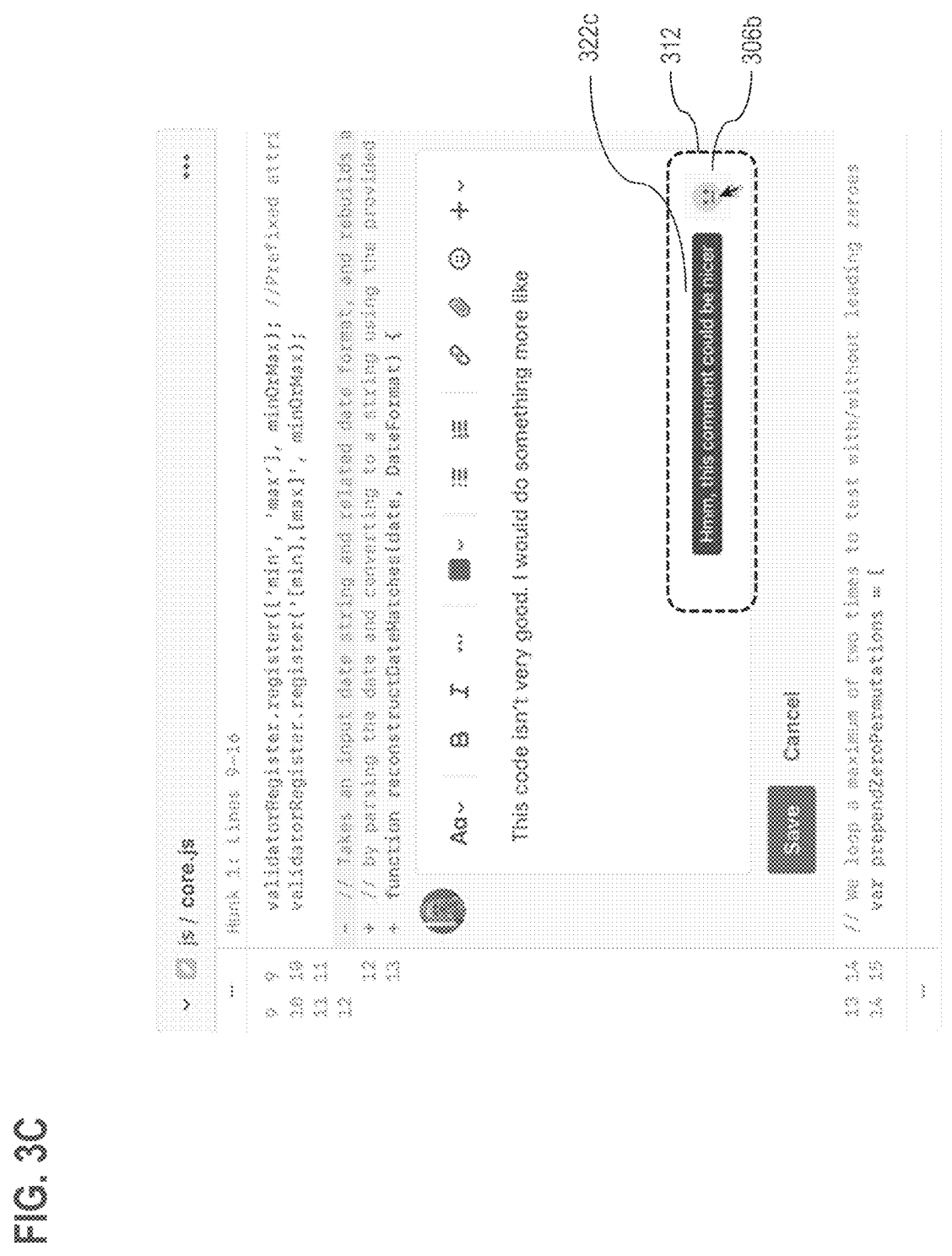

FIG. 3C illustrates an example screen of a graphical user interface in which a slightly negative comment is displayed, a sentiment indicator is displayed, and a related description or suggestion is displayed. In some embodiments, in response to receiving an indication of a user interaction with the third area 312, such as a mouse over or a mouse click on the icon 306, which may correspond to a request for more information regarding the estimated sentiment, the client device is programmed to cause a display of additional data, such as a textual description 322c. In this example, the textual description 322c further describes the estimated sentiment and how the estimated sentiment deviates from a desirable sentiment. The display of the textual description 322c can stop in response to the mouse leaving the third area 312 or a mouse—click on the icon 306, the textual description 322c, or elsewhere in the third area 312, for example.

Figure 3D:
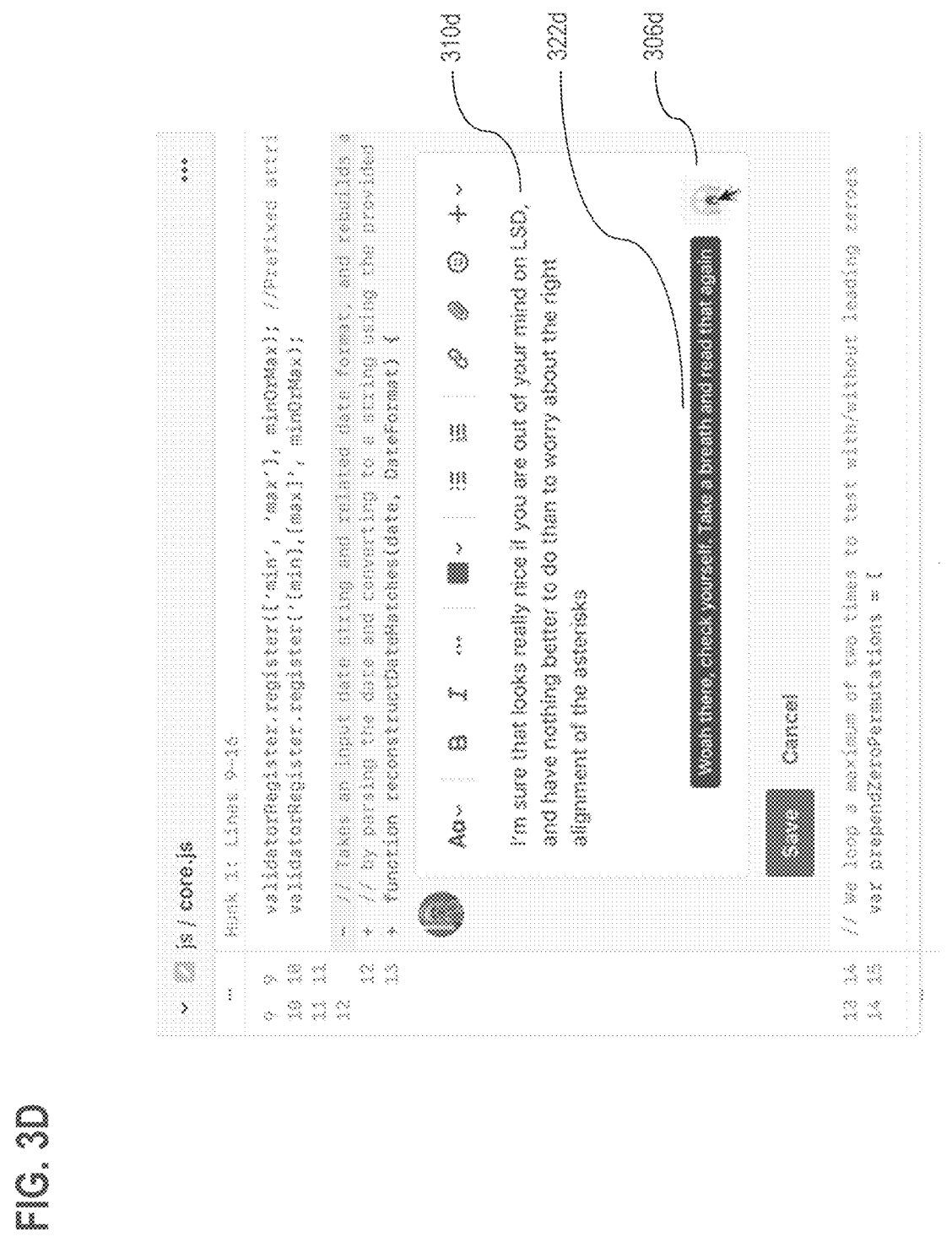

FIG. 3D illustrates an example screen of a graphical user interface in which a significantly negative comment is displayed, a sentiment indicator is displayed, and a related description or suggestion is displayed. In some embodiments, in response to receiving the entered comments 310d, the client device is programmed to estimate the sentiment of the entered comments 310d, as noted above. The client device is programmed to then cause a display or redisplay of the sentiment indicator with the appropriate value 306d. In this example, the entered comments sound quite negative, and thus the icon 306d has a horrified expression. The client device can be programmed to similarly cause a display of a textual description 322d in response to a further user interaction, as noted above. Alternatively, the textual description 322d can be displayed at the same time as the sentiment indicator 306d is displayed given the degree of negativity of the estimated sentiment.

In some embodiments, the client device can be programmed to cause a highlight of the portion of the entered comments that is a main contributor to an estimated negative sentiment or is especially inappropriate in a professional or public communication, based on the first predetermined list of such words, phrases, sentences, or sentence structures, as noted above. In this example, the word "LSD" or the phrase "out of your mind" or "nothing better to do" can be highlighted. In addition, the client device can be programmed to cause a display of a suggestion for rewriting the highlighted portion without necessarily indicating how to rewrite the highlighted portion. Alternatively, the client device can be programmed to cause a display of possible replacements of the highlighted portion, based on the second predetermined list of such words, phrases, sentences, or sentence structures, as also noted above.

In some embodiments, the client device is programmed to further counteract entered comments that show undesirable sentiments. The client device is programmed to cause a showing of a warning that the entered comments may be inappropriate and request an acknowledgement of the warning or a reason for publishing inappropriate comments or sharing undesirable sentiments. The warning and request can be presented as soon as the undesirable sentiments are determined or estimated or in response to a user request to submit the entered comments to the server 102. In response to the user request to submit the entered comments and an acknowledgment, the client device can be programmed to submit the entered comments with information regarding the corresponding estimated sentiment to the server 102. The client device can also be configured to take more restrictive measures before submitting the entered comments to the server, such as requiring a resubmission of the user request after a certain amount of time, a review of the entered comments by a supervisory account, or a rewrite of the entered comments for improved estimated sentiments. Alternatively, the client device can be configured to reject the user request at some point.

In some embodiments, the client device is programmed to enable submission of feedback on the estimated sentiment. The feedback can be in many forms, such as a rating, a vote or an agreement, a dislike or a disagreement, or a comment. The client device can be configured to process such feedback locally or transmit such feedback to the server 102 or another computing device to adjust the estimation of sentiments. For example, when more than a certain number of opinions have been received indicating that a certain phrase is humorous or inspiring rather than indicating any negative sentiment, that phrase may no longer be treated as showing a negative sentiment.

Figure 3E:
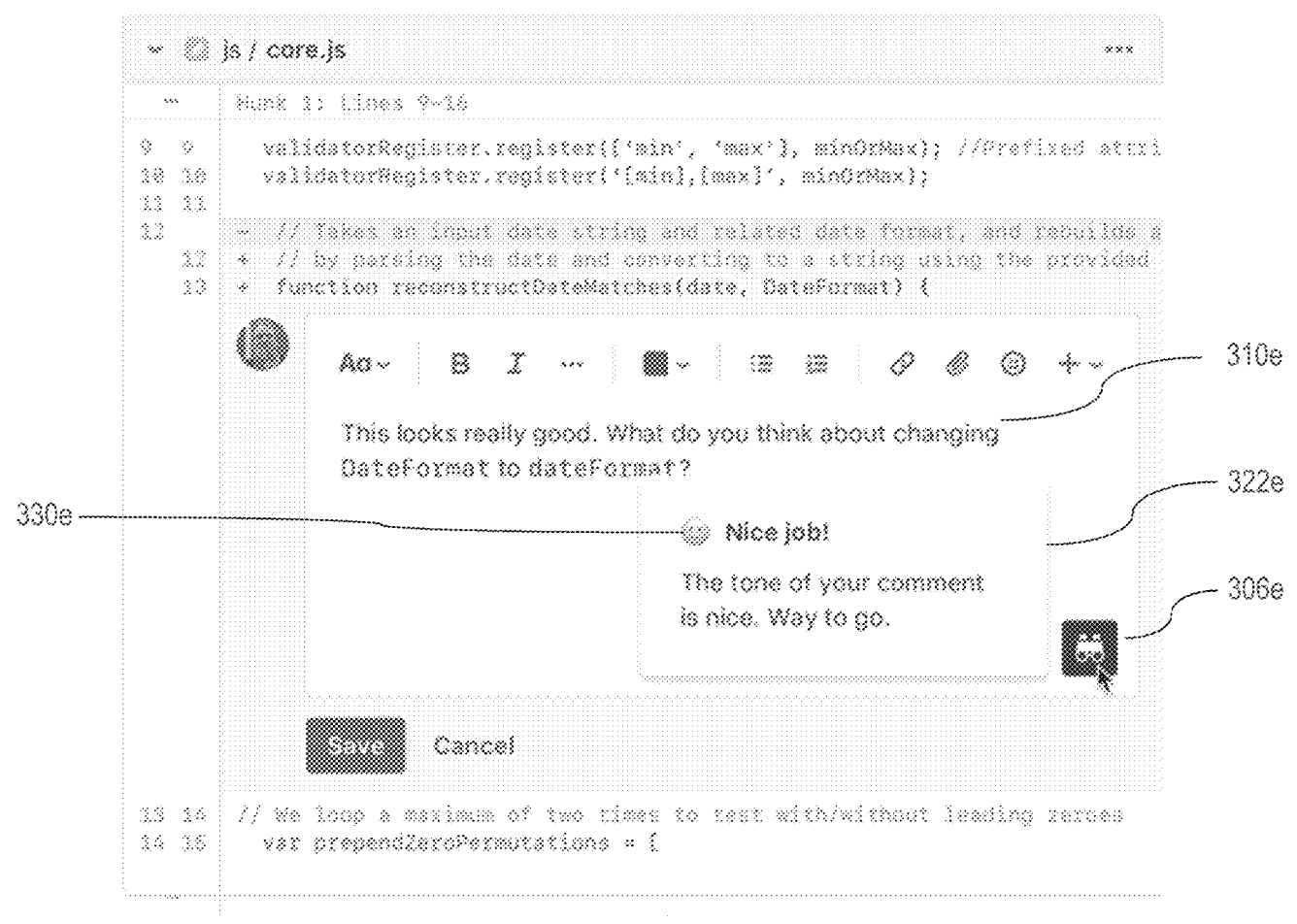

FIG. 3E illustrates an example screen of a graphical user interface in which a positive comment is displayed, a first sentiment indicator is displayed, and a related description or suggestion with a second sentiment indicator is displayed. In some embodiments, in response to receiving the entered comments 310e, the client device is programmed to estimate the sentiment of the entered comments 310e. The client device is programmed to then cause a display or redisplay of the sentiment indicator with the appropriate value 306e. In this example, the different values of the sentiment indicator 306 are expressed as different colors of the same symbol. For example, there can be three colors only, with green indicating a positive sentiment, yellow indicating a neutral sentiment, and red indicating a negative sentiment. In response to receiving an indication of a user interaction, the client device can be programmed to similarly cause a display of additional data, such as a second sentiment indicator 330, which can be more expressive than the sentiment indicator 306 or accompanied by a textual description. In this example, the entered comments sound quite positive, and thus the second sentiment indicator 330e shows a smiling face.

In some embodiments, the client device is programmed to estimate a sentiment as soon as the entered text include a certain number of additional characters, words, sentences, lines, or paragraphs, periodically, according to a specific schedule, upon a user request, or in response to any other event. For example, such an event could be that a certain amount of time has passed since any comment was last entered. The client device can be configured to cause a showing of two sentiment indicators simultaneously, one reflecting the sentiment for the text entered since the last sentiment estimation, and the other reflecting the sentiment for all the text entered and not yet submitted to the server. The display of the first sentiment indicator can be updated as the cursor moves to another location in the entered text.

Managing Data in the Distributed Computing Environment

In some embodiments, the server 102 is programmed to receive data submitted by a client device. The received data may include certain text, such as comments on the main contents and a corresponding sentiment value. The server 102 can be programmed to then store the received data and automatically broadcast the received data to the client devices in the distributed computing environment or make the received data available to a client device upon request. The received data may instead include user feedback on the GUI or the related data processing. The server 102 can be programmed to analyze all the received data to improve the GUI or the related data processing. For example, in response to a large volume of estimated negative sentiments being published in the distributed environment, the server may be configured to enforce more restrictive measures before those text associated with negative text is submitted or reinforce the suggestions for improving such text. For further example, in response to a large volume of user opinions that the sentiment indicator is not expressive enough, the server 102 can be configured to increase the values that can be taken on by the sentiment indicator. The server 102 is programmed to thus update the set of instructions for managing the GUI and the related data processing and make the updated set of instructions available to the client devices in the distributed computing environment.

Example Processes

Figure 4:
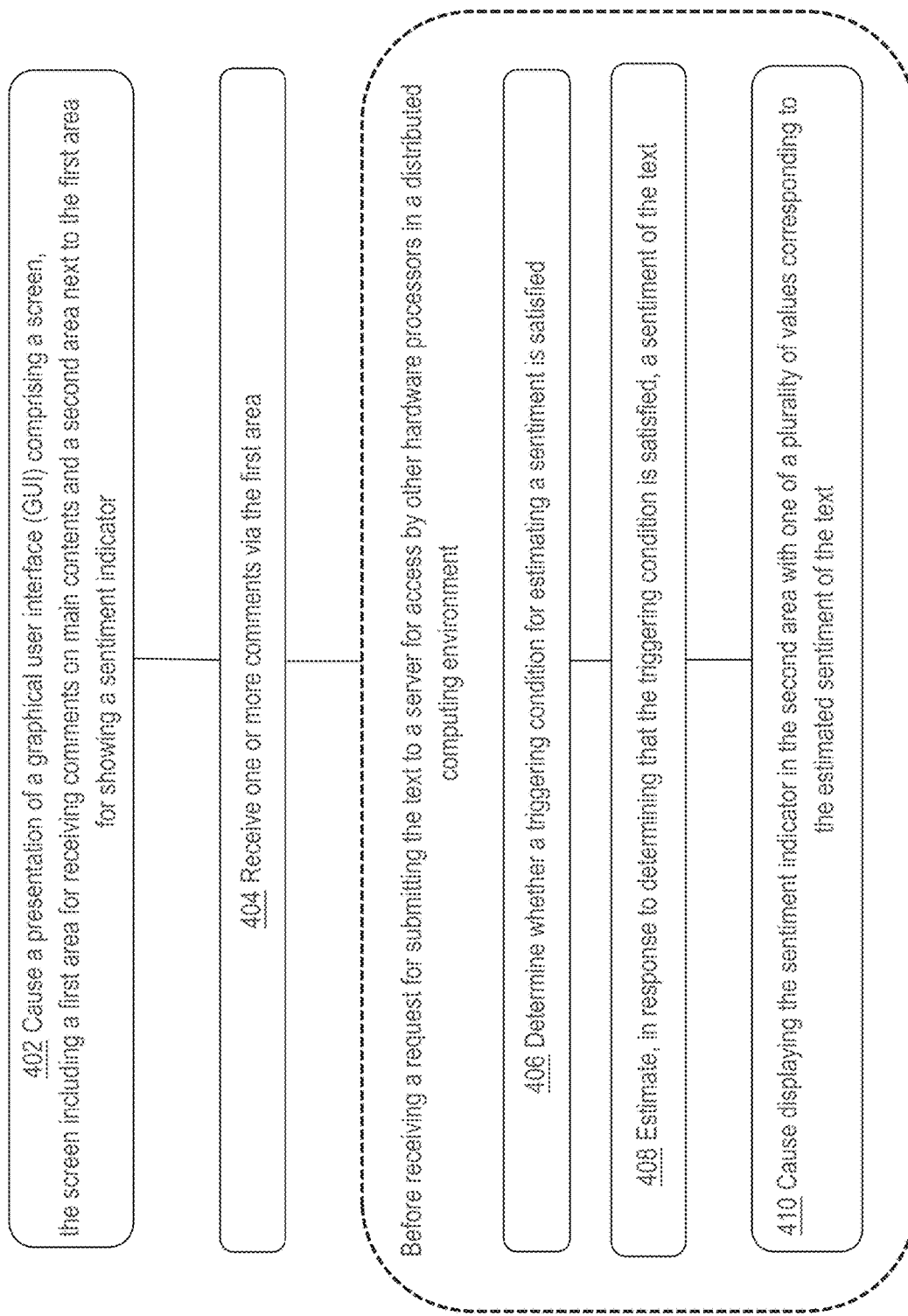
FIG. 4 illustrates an example process performed by a client device of presenting a sentiment indicator with entered text.

FIG. 4 illustrates an example process performed by a client device of presenting a sentiment indicator with entered text.

In some embodiments, in step 402, the client device is programmed or configured to cause a presentation of a graphical user interface comprising a screen. The screen includes a first area for receiving text, such as comments on main contents and a second area next to the first area for showing a sentiment indicator. The screen can also include additional areas for receiving or showing the main contents or comments already made on the main contents. The second area is normally right next to the first area, and the contents in the second area are typically shown in a less conspicuous manner than the contents in the first area. For example, the second area could be located below the first area so that as text is being entered into the first area, the sentiment indicator shown in the second area can be easily visible without being obtrusive.

In some embodiments, in step 404, the client device is programmed or configured to receive text via the first area. For example, a GUI widget such as a text box or other computer data input facility may be programmed to receive typed or pasted text representing comments. In some embodiments, the GUI is programmed using browser-executed code that is programmed to detect selection, at the client device, of the first area and entry of one or more keystrokes in the first area or a paste operation that enters data in the first area. The specific mechanism of receiving text is not critical. The text received via the first area may be at least transiently stored in memory.

Before receiving a request for submitting the text to a server for access by other hardware processors in a distributed computing environment, the client device is programmed to perform the following steps. In some embodiments, in step 406, the client device is programmed or configured to determine whether a triggering condition for estimating a sentiment of at least the text is satisfied. The triggering condition can be that a certain number of characters, words, sentences, lines, or paragraphs have been received via the first area since the GUI was presented or a sentiment estimation was last performed. The triggering condition can also be that a certain amount of time has passed since the GUI was presented, a sentiment estimation was last performed, or a character was last received via the first area, or that a user request for sentiment estimation has been received. Through continuous determination of whether the triggering condition is satisfied, the value of the sentiment indicator can be continuously updated to reflect the estimated sentiment as text is entered via the first area, as further discussed below, and before the text is submitted to the server for access by other hardware processors in a distributed computing environment.

In some embodiments, in step 408, in response to determining that the triggering condition is satisfied, the client device is programmed or configured to estimate a sentiment of at least a portion of the text received via the first area. In an embodiment, a computer program implementing FIG. 4 includes or calls computer program code that is programmed to calculate a sentiment score value for an arbitrary input string or set of characters. In some embodiments, logic for calculating a sentiment score is directly implemented in a computer program that implements FIG. 4, or using a local method call or library function. In some embodiments, obtaining a sentiment score value comprises invoking an external sentiment analysis service using an API call, RPC call, other programmatic call, parameterized URL, or other programmatic method of invoking an external service. An example external service is the Google Cloud Natural Language API. The invocation of the external service includes providing the contents of the first area to the external sentiment analysis service. The external sentiment analysis service returns a sentiment score value for the text that was provided as input. The sentiment score value may be in any of several different ranges of values such as real number values from 0 to 1, integer values of 0 to 99 and so forth.

In some embodiments, in step 410, the client device is programmed to further cause displaying the sentiment indicator in the second area with one of a plurality of values corresponding to the estimated sentiment of the text. More specifically, the client device is programmed to estimate the sentiment of the text determine a value of the sentiment indicator corresponding to the estimated sentiment. For example, the entered text might indicate a relatively positive sentiment, and the sentiment indicator might show a smiley-face emoji accordingly.

The sentiment indicator provides a near real-time assessment of the sentiment of the entered text and allows updating of the text before the text is finalized and sent to the server for access by other client devices, as further discussed below.

In some embodiments, the client device is programmed or configured to receive an indication of a user interaction with the second area where the sentiment indicator is displayed with a specific value. The user interaction may result from an intent to have more information regarding the estimated sentiment. In response to the indication, the client device is programmed to cause a showing of additional information in the second area, such as a textual description of the estimated sentiment or a textual suggestion of how to update the text to achieve a desirable sentiment.

In some embodiments, the client device is programmed or configured to receive a request for submitting the entered text to the server and take specific actions in response that request. When the estimated sentiment for the entered text meets a certain criterion, such as a negativity threshold, the client device can be configured to request assurance for submitting the entered text to the server and sharing the entered text with other computing devices in the distributed computing environment. For example, the assurance can be in the form of a confirmation or a reason for submission despite the excessively negative nature of the entered text.

Implementation Example—Hardware Overview

According to some embodiments, the techniques described herein are implemented by one or more special-purpose computing devices. The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, portable computer systems, handheld devices, networking devices or any other device that incorporates hard-wired and/or program logic to implement the techniques.

Figure 5:
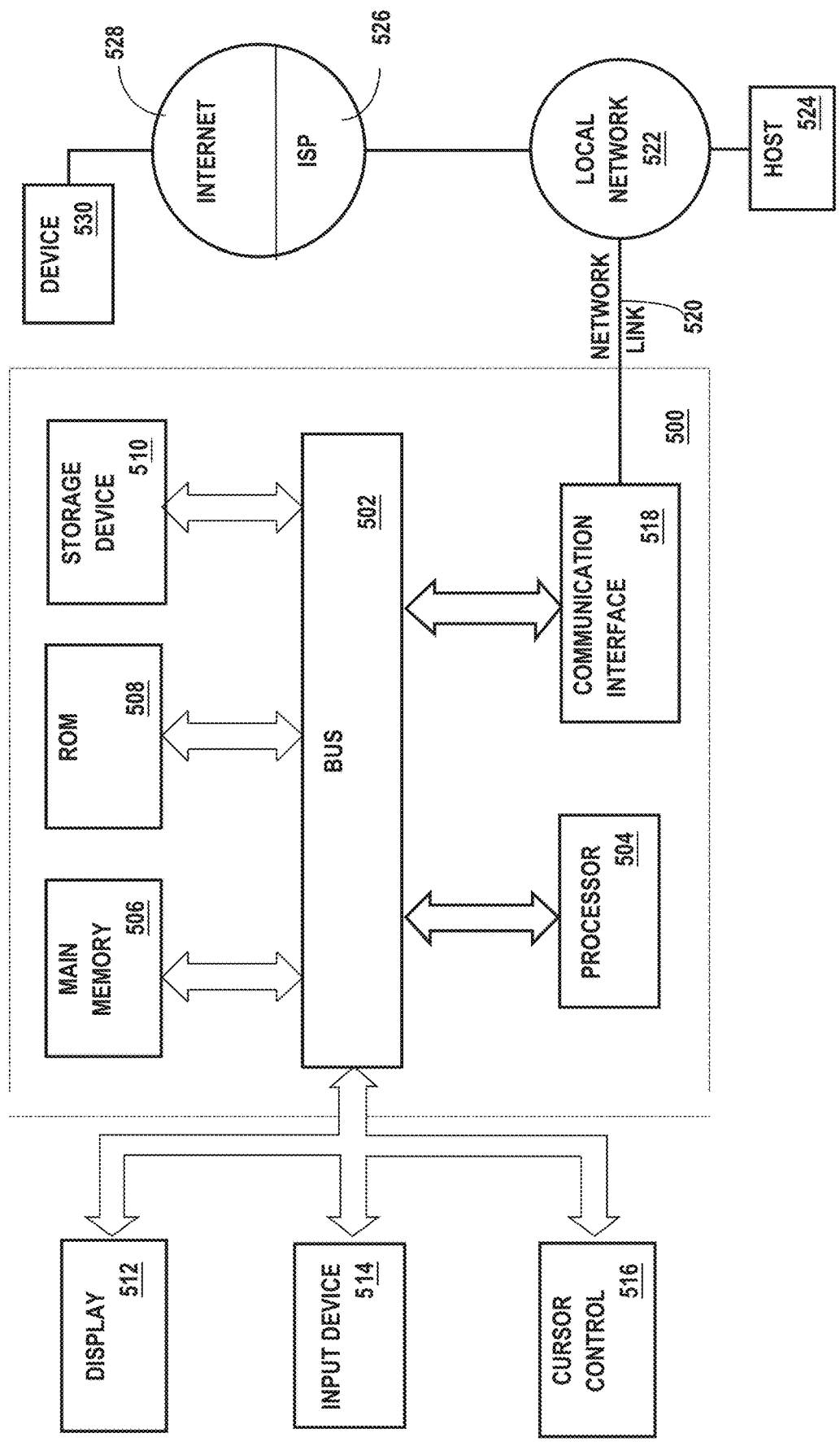
FIG. 5 is a block diagram that illustrates a computer system upon which an embodiment of the invention may be implemented.

For example, FIG. 5 is a block diagram that illustrates a computer system 500 upon which an embodiment of the invention may be implemented. Computer system 500 includes a bus 502 or other communication mechanism for communicating information, and a hardware processor 504 coupled with bus 502 for processing information. Hardware processor 504 may be, for example, a general purpose microprocessor.

Computer system 500 also includes a main memory 506, such as a random access memory (RAM) or other dynamic storage device, coupled to bus 502 for storing information and instructions to be executed by processor 504. Main memory 506 also may be used for storing temporary variables or other intermediate information during execution of instructions to be executed by processor 504. Such instructions, when stored in non-transitory storage media accessible to processor 504, render computer system 500 into a special-purpose machine that is customized to perform the operations specified in the instructions.

Computer system 500 further includes a read only memory (ROM) 508 or other static storage device coupled to bus 502 for storing static information and instructions for processor 504. A storage device 510, such as a magnetic disk, optical disk, or solid-state drive is provided and coupled to bus 502 for storing information and instructions.

Computer system 500 may be coupled via bus 502 to a display 512, such as an OLED, LED or cathode ray tube (CRT), for displaying information to a computer user. An input device 514, including alphanumeric and other keys, is coupled to bus 502 for communicating information and command selections to processor 504. Another type of user input device is cursor control 516, such as a mouse, a trackball, or cursor direction keys for communicating direction information and command selections to processor 504 and for controlling cursor movement on display 512. This input device typically has two degrees of freedom in two axes, a first axis (e.g., x) and a second axis (e.g., y), that allows the device to specify positions in a plane. The input device 514 may also have multiple input modalities, such as multiple 2-axes controllers, and/or input buttons or keyboard. This allows a user to input along more than two dimensions simultaneously and/or control the input of more than one type of action.

Computer system 500 may implement the techniques described herein using customized hard-wired logic, one or more ASICs or FPGAs, firmware and/or program logic which in combination with the computer system causes or programs computer system 500 to be a special-purpose machine. According to some embodiments, the techniques herein are performed by computer system 500 in response to processor 504 executing one or more sequences of one or more instructions contained in main memory 506. Such instructions may be read into main memory 506 from another storage medium, such as storage device 510. Execution of the sequences of instructions contained in main memory 506 causes processor 504 to perform the process steps described herein. In alternative embodiments, hard-wired circuitry may be used in place of or in combination with software instructions.

The term "storage media" as used herein refers to any non-transitory media that store data and/or instructions that cause a machine to operate in a specific fashion. Such storage media may comprise non-volatile media and/or volatile media. Non-volatile media includes, for example, optical disks, magnetic disks, or solid-state drives, such as storage device 510. Volatile media includes dynamic memory, such as main memory 506. Common forms of storage media include, for example, a floppy disk, a flexible disk, hard disk, solid-state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 502. Transmission media can also take the form of acoustic or light waves, such as those generated during radio-wave and infra-red data communications.

Various forms of media may be involved in carrying one or more sequences of one or more instructions to processor 504 for execution. For example, the instructions may initially be carried on a magnetic disk or solid-state drive of a remote computer. The remote computer can load the instructions into its dynamic memory and send the instructions over a telephone line using a modem. A modem local to computer system 500 can receive the data on the telephone line and use an infra-red transmitter to convert the data to an infra-red signal. An infra-red detector can receive the data carried in the infra-red signal and appropriate circuitry can place the data on bus 502. Bus 502 carries the data to main memory 506, from which processor 504 retrieves and executes the instructions. The instructions received by main memory 506 may optionally be stored on storage device 510 either before or after execution by processor 504.

Computer system 500 also includes a communication interface 518 coupled to bus 502. Communication interface 518 provides a two-way data communication coupling to a network link 520 that is connected to a local network 522. For example, communication interface 518 may be an integrated services digital network (ISDN) card, cable modem, satellite modem, or a modem to provide a data communication connection to a corresponding type of telephone line. As another example, communication interface 518 may be a local area network (LAN) card to provide a data communication connection to a compatible LAN. Wireless links may also be implemented. In any such implementation, communication interface 518 sends and receives electrical, electromagnetic or optical signals that carry digital data streams representing various types of information. Such a wireless link could be a Bluetooth, Bluetooth Low Energy (BLE), 802.11 WiFi connection, or the like.

Network link 520 typically provides data communication through one or more networks to other data devices. For example, network link 520 may provide a connection through local network 522 to a host computer 524 or to data equipment operated by an Internet Service Provider (ISP) 526. ISP 526 in turn provides data communication services through the world wide packet data communication network now commonly referred to as the "Internet" 528. Local network 522 and Internet 528 both use electrical, electromagnetic or optical signals that carry digital data streams. The signals through the various networks and the signals on network link 520 and through communication interface 518, which carry the digital data to and from computer system 500, are example forms of transmission media.

Computer system 500 can send messages and receive data, including program code, through the network(s), network link 520 and communication interface 518. In the Internet example, a device 530 might transmit a requested code for an application program through Internet 528, ISP 526, local network 522 and communication interface 518.

The received code may be executed by processor 504 as it is received, and/or stored in storage device 510, or other non-volatile storage for later execution.

In the foregoing specification, embodiments of the invention have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

What is claimed is:

1. A computer-implemented method of enabling distributed collaboration with sentiment indicators, comprising:
obtaining, by a processor, a set of computer-executable instructions, which when executed cause a client device of one or more client devices to operate a graphical user interface (GUI) configured for:
receiving text via a first area of a screen of the GUI;
estimating a sentiment of the text;
determining that the estimated sentiment exceeds a certain level of negativity;
after the determining, requesting a confirmation of releasing the text or an update of the text; and
receiving a response to the request and sending the text to a server;
transmitting the set of computer-executable instructions to a first client device of the one or more client devices.

2. The computer-implemented method of claim 1, further comprising:
managing a database of digital data being collaborated on by the one or more client devices;
sending certain content of the digital data to the first client device;
after the sending, receiving client data from the first client device;
transmitting the client data to a client device of the one or more client devices other than the first client device.

3. The computer-implemented method of claim 2, further comprising, before the sending, receiving the certain content from a device of the one or more client devices other than the first client device.

4. The computer-implemented method of claim 2, the client data including comments on the certain content, a sentiment value of the comments, or user feedback on the GUI.

5. The computer-implemented method of claim 2, further comprising:
storing the client data into a second database, the client data including a sentiment value;
determining that a number of sentiment values in the second database that exceed a negativity level exceeds a certain threshold;
effecting an update to the GUI that limits submission of sentiment values that exceed the negativity level.

6. The computer-implemented method of claim 2, further comprising:
storing the client data into a second database, the client data including user feedback on a sentiment indicator of the GUI;
determining that an amount of user feedback in the second database that exceeds a negativity level exceeds a certain threshold;
effecting an update to the GUI that improves usability of the sentiment indicator.

7. The computer-implemented method of claim 1, the GUI being further configured for showing a sentiment indicator in a second area next to the first area with a sentiment indicator value corresponding to the estimated sentiment of the text.

8. The computer-implemented method of claim 7, further comprising transmitting configuration data for the GUI or related processing specifying a position of the second area relative to a position of the first area, a form of the sentiment indicator, a list of values for the sentiment indicator, a triggering condition for estimating a sentiment, a list of actions to take in response to receiving a request via a certain area of the GUI for submitting entered text, or a list of types of additional information to display in response to a user interaction with the second area.

9. The computer-implemented method of claim 1, the GUI being further configured for, in response to determining that the estimated sentiment exceeds a certain level of negativity, causing an additional highlighting of one or more words of the text that cause the estimated sentiment to exceed the certain level of negativity.

10. A computer-implemented method, comprising:
causing, by a processor of a computing device, displaying a GUI comprising a screen including a first area for receiving text related to main contents and a second area next to the first area for showing a sentiment indicator;
receiving text via the first area;
causing showing the sentiment indicator having one of a plurality of values, the one value corresponding to an estimated sentiment of the text, in the second area, before the text is submitted to a server for access by other computing devices in a distributed computing environment;
receiving an indication of an interaction with the second area;
causing showing additional data related to the estimated sentiment in the second area,
the additional data including a suggestion of how to update the text to improve the estimated sentiment.

11. One or more non-transitory computer-readable storage media storing sequences of instructions which when executed cause one or more hardware processors to perform a computer-implemented method of presenting a sentiment indicator with entered text, the method comprising:
causing a presentation of a graphical user interface (GUI) comprising a screen, the screen including a first area for receiving text and a second area next to the first area for showing a sentiment indicator;
receiving text via the first area;
determining, automatically and continuously, whether a triggering condition for estimating a sentiment is satisfied, the triggering condition being related to a size of a portion of the text, an amount of elapsed time since a predetermined timepoint, or a user request, such that:
in response to determining that the triggering condition is satisfied, estimating a sentiment of the text; and
causing displaying the sentiment indicator in the second area with a sentiment indicator value of a plurality of sentiment indicator values corresponding to the estimated sentiment of the text.

12. The one or more non-transitory computer-readable storage media of claim 11, the triggering condition being that a certain amount of time has passed since the GUI was presented, a sentiment estimation was last performed, or a character was last received via the first area.

13. The one or more non-transitory computer-readable storage media of claim 11, the triggering condition being that a certain number of characters, words, sentences, lines, or paragraphs have been received via the first area since the GUI was presented or a sentiment estimation was last performed.

14. The one or more non-transitory computer-readable storage media of claim 11, the method further comprising:
after causing displaying the sentiment indicator with the sentiment indicator value, receiving an indication of an interaction with the second area;
in response to the indication, causing showing additional data related to the estimated sentiment.

15. The one or more non-transitory computer-readable storage media of claim 14,
the sentiment indicator being an icon or a sound snippet,
the additional data indicating more information regarding the estimated sentiment than the sentiment indicator.

16. The one or more non-transitory computer-readable storage media of claim 14, the additional data including a suggestion of how to update the text to improve the estimated sentiment.

17. The one or more non-transitory computer-readable storage media of claim 11, the method further comprising:
determining that the estimated sentiment satisfies a specific criterion;
after the determining, causing an additional highlighting of a portion of the text in the first area that causes the estimated sentiment to satisfy the specific criterion.

18. The one or more non-transitory computer-readable storage media of claim 11,
the sentiment indicator being an icon,
the plurality of sentiment indicator values being emojis expressing different sentiments.

19. The one or more non-transitory computer-readable storage media of claim 11, the method further comprising,
the estimating comprising obtaining a sentiment score value,
mapping the sentiment score value to the sentiment indicator value out of a plurality of sentiment indicator values.

20. The one or more non-transitory computer-readable storage media of claim 11, the screen having a third area for receiving or showing main contents, the text received via the first area being comments on the main contents.

\* \* \* \* \*